US009411633B2

(12) United States Patent
Lih et al.

(10) Patent No.: US 9,411,633 B2
(45) Date of Patent: Aug. 9, 2016

(54) SYSTEM AND METHOD FOR BARRIER COMMAND MONITORING IN COMPUTING SYSTEMS

(71) Applicant: Futurewei Technologies, Inc., Plano, TX (US)

(72) Inventors: Iulin Lih, San Jose, CA (US); Chenghong He, Shenzhen (CN); Hongbo Shi, Xian (CN); Naxin Zhang, Singapore (SG)

(73) Assignee: Futurewei Technologies, Inc., Plano, TX (US)

( * ) Notice: Subject to any disclaimer, the term of this patent is extended or adjusted under 35 U.S.C. 154(b) by 361 days.

(21) Appl. No.: 13/952,331

(22) Filed: Jul. 26, 2013

(65) Prior Publication Data

US 2014/0033209 A1 Jan. 30, 2014

Related U.S. Application Data

(60) Provisional application No. 61/676,544, filed on Jul. 27, 2012, provisional application No. 61/677,057, filed on Jul. 30, 2012, provisional application No. 61/677,921, filed on Jul. 31, 2012, provisional application No. 61/780,442, filed on Mar. 13, 2013.

(51) Int. Cl.
*G06F 9/46* (2006.01)
*G06F 9/52* (2006.01)

(52) U.S. Cl.
CPC ............... *G06F 9/466* (2013.01); *G06F 9/522* (2013.01)

(58) Field of Classification Search
None
See application file for complete search history.

(56) References Cited

U.S. PATENT DOCUMENTS

| 7,475,397 | B1 * | 1/2009 | Garthwaite | ......... G06F 9/30087 712/203 |
| 7,512,950 | B1 | 3/2009 | Marejka | |
| 2007/0143755 | A1 | 6/2007 | Sahu et al. | |
| 2011/0119468 | A1 | 5/2011 | Kumar et al. | |
| 2013/0151799 | A1 | 6/2013 | Panavich et al. | |

OTHER PUBLICATIONS

Foreign Communication From A Counterpart Application, PCT Application No. PCT/US2013/052370, International Search Report dated Nov. 2013, 5 pages.
Foreign Communication From A Counterpart Application, PCT Application No. PCT/US2013/052370, Written Opinion dated Nov. 2013, 7 pages.

* cited by examiner

*Primary Examiner* — Wissam Rashid
(74) *Attorney, Agent, or Firm* — Conley Rose, P.C.; Grant Rodolph; Adam J. Stegge

(57) ABSTRACT

A computing system for handling barrier commands includes a memory, an interface, and a processor. The memory is configured to store a pre-barrier spreading range that identifies a target computing system associated with a barrier command. The interface is coupled to the memory and is configured to send a pre-barrier computing probe to the target computing system identified in the pre-barrier spreading range and receive a barrier completion notification messages from the target computing system. The pre-barrier computing probe is configured to instruct the target computing system to monitor a status of a transaction that needs to be executed for the barrier command to be completed. The processor is coupled to the interface and is configured to determine a status of the barrier command based on the received barrier completion notification messages.

19 Claims, 8 Drawing Sheets

SYSTEM AND METHOD FOR BARRIER COMMAND MONITORING IN COMPUTING SYSTEMS

CROSS-REFERENCE TO RELATED APPLICATIONS

The present application claims priority to U.S. Provisional Patent Application No. 61/676,544, filed Jul. 27, 2012 entitled "Memory Barrier Operations for Computing Systems," U.S. Provisional Patent Application No. 61/677,057, filed Jul. 30, 2012 entitled "Handling of Barrier Commands for Computing Systems," U.S. Provisional Patent Application No. 61/677,921, filed Jul. 31, 2012 entitled "Synchronization Barrier Operations for Computing Systems," and U.S. Provisional Patent Application No. 61/780,442, filed Mar. 13, 2013 entitled "Handling of Barrier Commands for Computing Systems," all of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A computer program may include a number of different transactions that are executed by a number of different computing systems. In certain circumstances, at least some of the transactions may need to be executed in a particular order. For instance, some transactions may need to be executed before other transactions for the program to provide a correct result. One method of controlling the order in which transactions are executed is to only issue transactions in the order in which they need to be executed. Another method of controlling the order in which transactions are executed is to use barrier commands. A barrier command can be used to hold a computing system to a particular state until specified conditions are met. For example, a barrier command can prevent a computing system from executing certain transactions until other transactions have been executed.

SUMMARY

In one embodiment, the disclosure includes a computing system having a memory, an interface, and a processor. The memory is configured to store a pre-barrier spreading range that identifies a target computing system associated with a barrier command. The interface is coupled to the memory and is configured to send a pre-barrier computing probe to the target computing system identified in the pre-barrier spreading range and receive a barrier completion notification message from the target computing system. The pre-barrier computing probe is configured to instruct the target computing system to monitor a status of a transaction that needs to be executed for the barrier command to be completed. The processor is coupled to the interface and is configured to determine a status of the barrier command based on the received barrier completion notification messages.

In another embodiment, the disclosure includes a computing system having an interface and a processor. The interface is configured to receive a pre-barrier computing probe from a source computing system and send a barrier completion notification message to the source computing system. The pre-barrier computing probe instructs the computing system to monitor a status of a transaction that is associated with a barrier command, and the barrier completion notification message indicates that the transaction associated with the barrier command has been executed by the system or that the computing system guarantees that it will behave like it has executed the transaction. The processor is coupled to the interface and is configured to wait to execute an early-forwarded transaction until a post-barrier start notice is received from the source computing system, wherein the early-forwarded transaction comprises a transaction that can only be executed after the barrier command is completed, and wherein the post-barrier start notice indicates that the barrier command associated with the early-forwarded transaction has been completed.

In another embodiment, the disclosure includes a method for handling barrier commands. A transaction and a target computing system associated with a barrier command are identified. The identified target computing system is sent a pre-barrier computing probe. The pre-barrier computing probe instructs the target computing system to monitor an execution status of the transaction associated with the completion of the barrier command. A barrier completion notification message is received from the target computing system, and the barrier completion notification message indicates that the target computing system has executed the transaction associated with the completion of the barrier command or that the target computing system can guarantee that it will behave like it has executed the transaction associated with the completion of the barrier command. A determination is made whether the barrier command is completed based on the received barrier completion notification message, wherein the barrier command is determined to have been completed when all target computing systems that were sent pre-barrier computing probes have returned their barrier completion notifications.

In yet another embodiment, the disclosure includes a method for handling barrier commands that comprises receiving a pre-barrier computing probe from a source computing system. The pre-barrier computing probe is configured to instruct a target computing system that receives the pre-barrier computing probe to monitor a status of a transaction that is associated with a barrier command. A barrier completion notification message that indicates that the transaction associated with the barrier command has been executed or that the target computing system guarantees that it will behave like it has executed the transaction. An early-forwarded transaction is received by the target computing system before a barrier command associated with the early-forwarded transaction is completed, wherein the early-forwarded transaction can only be executed after the barrier command associated with the early-forwarded transaction is completed. The early-forwarded transaction is executed after receiving a post-barrier start notice from the source computing system that indicates that the barrier command associated with the early-forwarded transaction has been completed.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
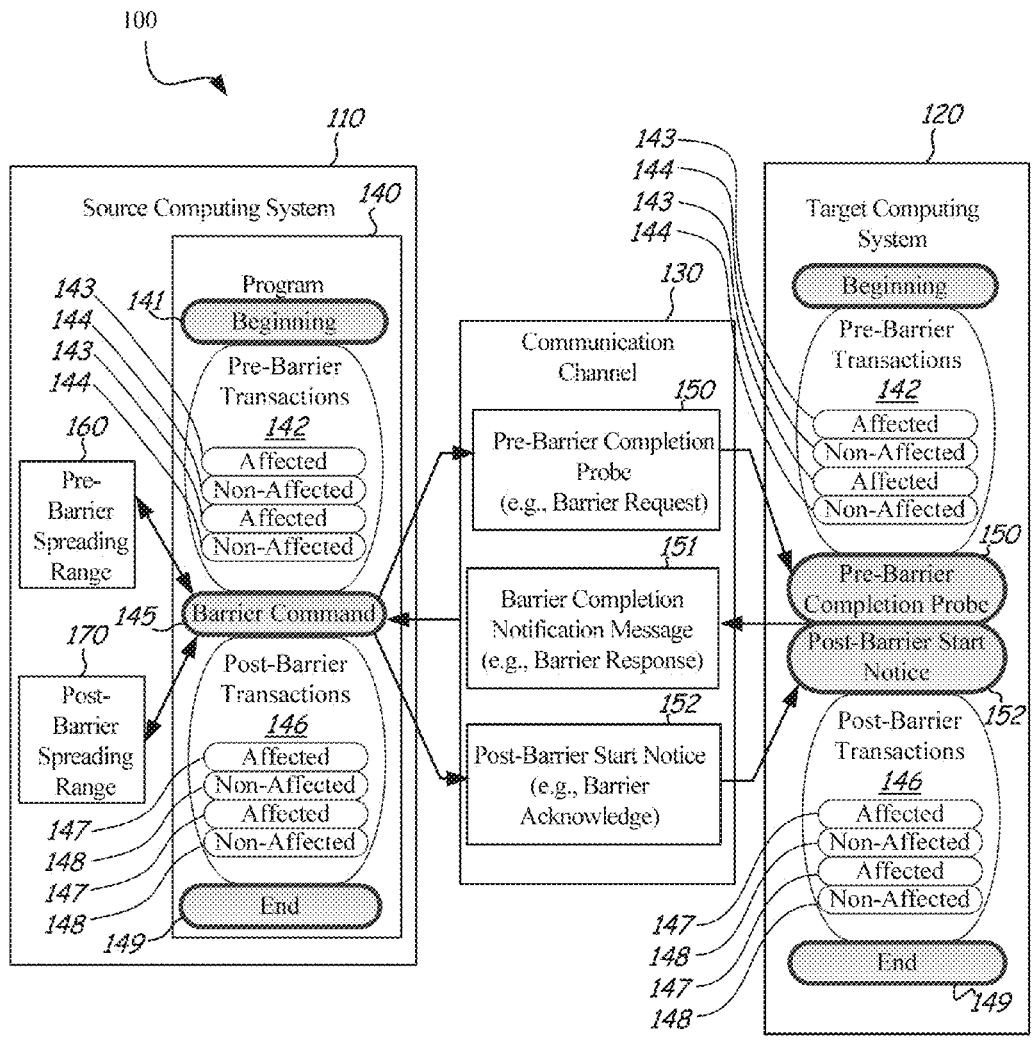
FIG. 1 is a schematic diagram of a computing system network that uses barrier commands.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

Embodiments of the present disclosure include methods and apparatuses for handling barrier commands for computing systems. In one embodiment, pre-barrier completion probes are sent to target computing systems that need to execute certain transactions for a barrier command to be completed. Based on receiving the pre-barrier completion probes, the target computing systems monitor the status of the transactions and send a barrier completion notification message to a source computing system when the target computing systems have executed the transactions or when the target computing systems can guarantee that they will behave like they have executed the transactions. The source computing system can then monitor the status of the barrier command based on the barrier completion notification messages. For instance, if the source computing system has not received barrier completion notification messages from all of the target computing systems that received the pre-barrier completion probes, the source computing system can determine that the barrier command has not yet been completed. If the source computing system has received the barrier completion notification messages from all of the target computing systems that received the pre-barrier completion probes, the source computing system can determine that the barrier command has been completed. Accordingly, the source computing system can use the pre-barrier completion probes to monitor the status of a barrier command.

In another embodiment, a source computing system identifies transactions that are being sent to target computing systems early as being early-forwarded transactions. For instance, transactions that can only be executed after a barrier command is completed can be sent to target computing systems before the barrier command is completed. In such a case, the transactions are identified as being early-forwarded transactions (e.g., early-forwarded post-barrier transactions). Once the transactions are identified as being early-forwarded transactions, the target computing systems that receive the early-forwarded transactions will wait to execute the transactions until they receive a post-barrier start notice from the source computing system. The post-barrier start notice indicates that the required barrier command has been completed and that the target computing system can execute the early-forwarded transactions.

Systems that use the pre-barrier completion probes, the post-barrier start notices, and/or other features described in this disclosure may be beneficial over other types of barrier command systems. For instance, other barrier command systems may send barrier commands to all of the target computing systems that receive transactions to execute. This can unnecessarily halt or slow the performance of computing systems and increase messaging traffic. In at least certain embodiments of this disclosure, only target systems that have transactions that need to be executed for a barrier command to be completed receive pre-barrier completion probes, and only target systems that have transactions that can only be executed after a barrier command is completed receive post-barrier start notices. Accordingly, barrier command messaging traffic is reduced by only sending messages to the required target computing systems and not sending messages to all of the target computing systems. Additionally, the target computing systems that receive early-forwarded transactions can execute any other transactions that are not identified as being early-forwarded transactions. Therefore, target computing systems are not unnecessarily halted or slowed down. Further features and benefits of embodiments are described below and shown in the accompanying figures.

FIG. 1 is a schematic diagram of a computing system network 100 that uses a barrier command 145. Network 100 includes a source computing system 110 and a target computing system 120. Although the particular example shown in FIG. 1 only shows one source computing system 110 and one target computing system 120, embodiments are not limited to any particular number of source and target computing systems and can include any number of source and target computing systems. Additionally, although computing systems 110 and 120 are identified as either being a source computing system or a target computing system, any of the computing systems 110 and 120 may act as a source computing system, a target computing system, or both a source and a target computing system.

Each computing system 110 and 120 may be a stand-alone computing device (e.g., a personal computer, a laptop, a smart phone, a server, a tablet, etc.) or may be a component of a larger computing device (e.g., a central processing unit or a core of a multi-core central processing unit). Computing systems 110 and 120 are communicatively coupled to each other through a communication channel 130. In an embodiment in which computing systems 110 and 120 are stand-alone computing devices, communication channel 130 may be a computing network such as, but not limited to, the Internet, a local-area network, etc. In an embodiment in which computing systems 110 and 120 are components of a larger computing device, communication channel 130 may be interconnections or a bus on a motherboard, a computer chip, a computer chip package, etc. Accordingly, embodiments of the present disclosure may be used in either an intra-chip setting or in an inter-chip setting.

Source computing system 110 comprises a computer program 140 that includes a beginning 141, a group of pre-barrier transactions 142, a barrier command 145, a group of post-barrier transactions 146, and an end 149. The group of pre-barrier transactions 142 optionally includes one or more affected transactions 143 and one or more non-affected transactions 144. The pre-barrier affected transactions 143 comprise transactions that need to be executed for the barrier command 145 to be completed. The pre-barrier non-affected transactions 144 comprise transactions that occur before the barrier command 145, but do not need to be executed for barrier command 145 to be completed. Similarly, the group of post-barrier transactions 146 also optionally includes one or more affected transactions 147 and one or more non-affected transactions 148. The post-barrier affected transactions 147 comprise transactions that can only be executed after the barrier command 145 is completed. The post-barrier non-affected transactions 148 comprise transactions that occur after the barrier command 145, but do not need to wait for the barrier command 145 to be completed before they are executed. In other words, both the pre-barrier non-affected transactions 144 and the post-barrier non-affected transactions 148 can be executed at any time. However, the pre-barrier affected transactions 143 need to be executed for the barrier command 145 to be completed, and the post-barrier affected transactions 147 can only be executed after the barrier command 145 is completed. Additionally, it should be noted that although the specific example shown in FIG. 1 only shows two groups of transactions 142, 146 and one barrier command 145, embodiments are not limited to any particular number transactions, groups of transactions, or barrier commands and can include any number of transactions, groups of transactions, and barrier commands.

In one embodiment, computing system network 100 uses a pre-barrier completion probe 150 (e.g., a barrier request or a pre-barrier computing probe) to determine when barrier command 145 is completed such that post-barrier affected transactions 147 can be executed. For example, in FIG. 1, target computing system 120 receives pre-barrier transactions 142 that may include pre-barrier affected transactions 143 and pre-barrier non-affected transactions 144. Accordingly, source computing system 110 sends a pre-barrier completion probe 150 through communication channel 130 to target computing system 120. Pre-barrier completion probe 150 instructs target computing system 120 to monitor the execution status of pre-barrier affected transactions 143. When target computing system 120 has executed all of the pre-barrier affected transactions 143 or when target computing system 120 can guarantee that it will behave like it has completed all of the pre-barrier affected transactions 143, it sends a barrier completion notification message 151 (e.g., a barrier response) through communication channel 130 to source computing system 110. The barrier completion notification message 151 informs source computing system 110 that target computing system 120 has either finished executing pre-barrier affected transactions 143 or that target computing system 120 guarantees that it will behave like it has finished executing pre-barrier affected transactions 143.

Source computing system 110 receives the barrier completion notification message 151 and uses it to determine whether the barrier command 145 is completed. For instance, source computing system 110 may have a pre-barrier spreading range 160 that identifies all of the target computing systems that need to execute transactions for barrier command 145 to be completed (e.g., the pre-barrier spreading range can identify all of the target computing systems that may potentially receive pre-barrier affected transactions). In one embodiment, pre-barrier spreading range 160 may include a list of addresses or other identifiers (IDs) of target computing systems that need to execute transactions for a barrier command to be completed. When source computing system 110 receives the barrier completion notification message 151 from target computing system 120, source computing system 110 can remove target computing system 120 from the pre-barrier spreading range 160 or mark target computing system 120 as having finished executing its transactions. Additionally, it should be noted that source computing system 110 can also remove a target computing system (e.g., target computing system 120) from the pre-barrier spreading range or mark the target computing system as having finished executing its transactions when the pre-barrier completion probes (e.g., pre-barrier completion probe 150) are sent to the target computing systems. For instance, if a target computing system receives a pre-barrier affected transaction (e.g., transaction 143) and the target computing system has already executed the pre-barrier affected transaction before the pre-barrier completion probes are sent, that particular target computing system does not need to be sent a pre-barrier completion probe because the status of the pre-barrier affected transaction does not need to be monitored. Therefore, in such a case, the target computing system can be removed from the pre-barrier spreading range or can be marked as having finished executing its transactions when the pre-barrier completion probes are sent. Accordingly, a target computing system can be removed from the pre-barrier spreading list or can be marked as being finished either when the pre-barrier completion probes are sent or when the source computing system has received the barrier completion notification message (e.g., message 151) from the target computing system. When all of the target computing systems are removed from the spreading range 160 or when all of the target computing systems have been marked as having finished executing their transactions (or have guaranteed that they will behave like they have finished executing their transactions), source computing system 110 can determine that barrier command 145 is completed and that the post-barrier affected transactions 147 can now be executed. Additionally, it should be noted that in a multi-barrier command setting, that pre-barrier spreading range 160 may include a table for each barrier command in a program, and each table may include the addresses or other IDs of the target computing systems that receive pre-barrier affected transaction for a particular barrier command.

Once source computing system 110 determines that barrier command 145 is completed, source computing system 110 sends a post-barrier start notice 152 (e.g., a barrier acknowledge) through communication channel 130 to target computing system 120. Post-barrier start notice 152 instructs target computing system 120 that barrier command 145 has been completed and that target computing system 120 can execute post-barrier affected transactions 147. In one embodiment, source computing system 110 includes a post-barrier spreading range 170 that is used to determine which target computing systems receive post-barrier start notices. For instance, post-barrier spreading range 170 may include a list of addresses or other IDs of the target computing systems that receive transactions that need to be executed after the barrier command is completed (e.g., the post-barrier spreading range 170 can include a list of target computing systems having post-barrier affected transactions 147). When source computing system 110 determines that a barrier command is completed, source computing system 110 can use post-barrier spreading range 170 to determine which target computing systems need to be sent the post-barrier start notice so that they will know that they can execute the post-barrier affected transactions. Additionally, in a multi-barrier command setting, post-barrier spreading range 170 may include a table for each barrier command in a program, and each table may include the addresses or other IDs for the target computing systems that receive post-barrier affected transactions 147.

Figure 2:
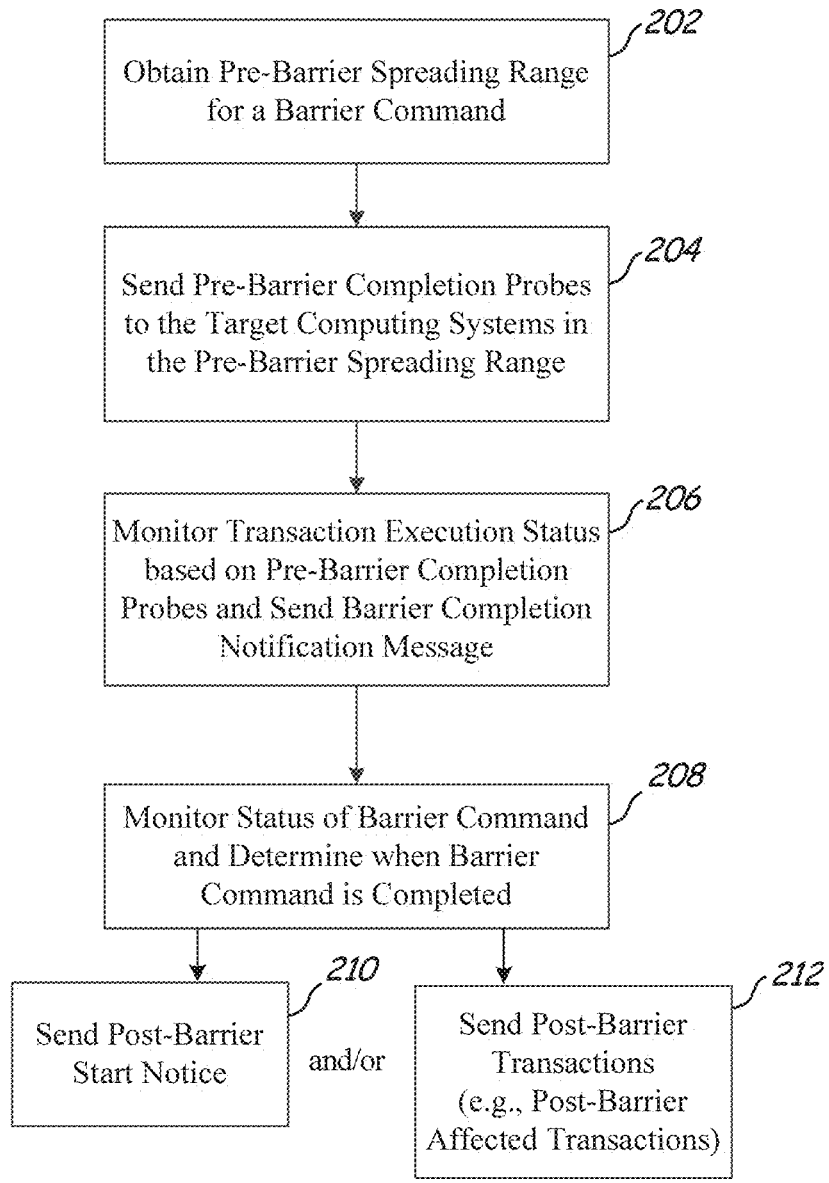
FIG. 2 is a flow diagram of a method of using pre-barrier spreading ranges, pre-barrier completion probes, and barrier completion notification messages to determine when a barrier command is completed.

FIG. 2 is a flow diagram of a method of using pre-barrier spreading ranges, pre-barrier completion probes, and barrier completion notification messages to determine when a barrier command is completed. At block 202, a pre-barrier spreading range is obtained for a barrier command in a program. In one embodiment, pre-barrier spreading ranges are dynamically determined by hardware (e.g., a processing unit and/or memory of a computing system). For instance, the hardware can dynamically collect the addresses or IDs of the target computing systems that the source computing system has forwarded transactions to that need to be executed for the barrier command to be completed (e.g., pre-barrier affected transactions). The hardware can then create a list or a table for each barrier command that includes the addresses or IDs of those target computing systems. Additionally, in at least some circumstances, the hardware may be able to determine whether transactions forwarded to the target computing systems have been executed or not (e.g., the source computing system may receive a message from a target computing system acknowledging that it has executed a transaction). In such a case, the hardware can add only the target computing systems that have been forwarded transactions that have not yet been executed to the pre-barrier spreading range. This can be useful to minimize the number of pre-barrier completion probes that need to be sent and monitored by the source and target computing systems.

In another embodiment, the pre-barrier spreading ranges may be pre-determined by software. For example, software can be used to generate a list or a table that includes the addresses or IDs of the target computing systems that may potentially receive transactions that need to be executed for a barrier command to be completed. The pre-determined spreading ranges can then be stored and retrieved as necessary. In one embodiment, each barrier command may have an index to one of the pre-determined spreading ranges such that the index can be used to retrieve the list of addresses or IDs of the target computing systems associated with that barrier command. However, embodiments are not limited to any particular method for generating or obtaining a pre-barrier spreading range, and embodiments can include pre-barrier spreading ranges generated or obtained in any manner.

At block 204, pre-barrier completion probes are sent to the target computing systems in the pre-barrier spreading range obtained at block 202. In one embodiment, any target computing systems that have already finished executing their pre-barrier affected transactions before the pre-barrier completion probes are sent may be removed from the pre-barrier spreading range or be marked as having finished executing their transactions when the pre-barrier completion probes are sent, and those target computing systems are not sent pre-barrier completion probes. The pre-barrier completion probes that are sent may identify the transactions that need to be executed (e.g., the pre-barrier affected transactions) and/or the number of transactions that need to be executed. Additionally, in a multi-barrier command setting, the pre-barrier completion probes may identify one of the multiple barrier commands. For instance, if a target computing system needs to execute three transactions for a first barrier command, the pre-barrier completion probe may include an indication that three transactions need to be executed and that the probe is associated with the first barrier command. At block 206, the target computing systems monitor the execution status of the transactions based on the pre-barrier completion probes and send the source computing system a barrier completion notification message when all required transactions are executed or when the target computing system can guarantee that it will behave like it has executed all of the required transactions. Each barrier completion notification message may optionally include an indication of the target computing system and an indication of the relevant barrier command. At block 208, the source computing system monitors the status of the barrier commands based on receiving the barrier completion notification messages and determines when a barrier command is completed. For instance, the source computing system can remove target computing systems from the pre-barrier spreading range as it receives the barrier completion notification messages from the target computing systems. Then, when the pre-barrier spreading range does not include any target computing systems, the source computing system can determine that the barrier command is completed. Alternatively, the source computing system can identify (e.g., mark) the target computing systems in the pre-barrier spreading range as having finished their transactions when it receives the barrier completion notification messages, and the source computing system can determine that the barrier command is completed when all of the target computing systems in the pre-barrier spreading range have been identified as having finished their transactions.

At block 210, after the source computing system determines that a barrier command is completed, the source computing system optionally sends a post-barrier start notice to target computing systems that were forwarded post-barrier affected transactions before the barrier command was completed. In addition or in the alternative, after the source computing system determines that a barrier command is completed, the source computing system optionally forwards the post-barrier affected transactions to the target computing systems at block 212.

Figure 3:
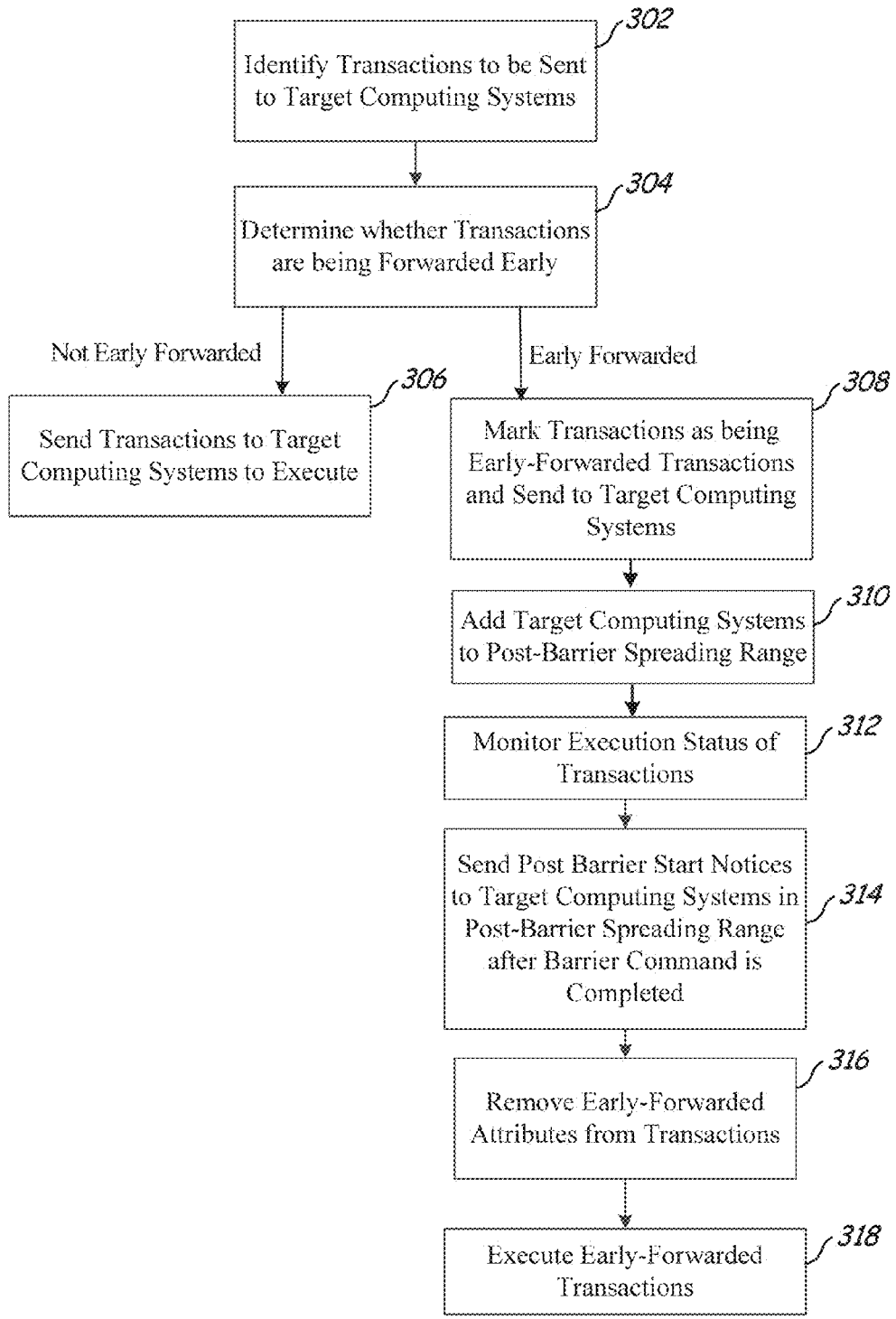
FIG. 3 is a flow diagram of a method of using post-barrier spreading ranges, early-forwarding attributes, and post-barrier start notices to control the execution of post-barrier transactions.

FIG. 3 is a flow diagram of a method of using post-barrier spreading ranges, early-forwarding attributes, and post-barrier start notices to control the execution of post-barrier affected transactions. At block 302, transactions to be forwarded to target computing systems are identified. At block 304, a determination is made with respect to each transaction whether the transaction is being forwarded to the target computing system early. For example, if a transaction is forwarded to a target computing system before a required barrier command is completed, the transaction is determined to be an early-forwarded transaction (e.g., an early-forwarded post-barrier affected transaction). If the transaction is not being forwarded early, the transaction is sent to the target computing system without being identified as being forwarded early at block 306. Accordingly, the target computing system can execute the transaction immediately. If the transaction is being forwarded early, the transaction is marked as being forwarded early and is sent to the target computing system at block 308. In one embodiment, a transaction may have an early-forwarding attribute that identifies the transaction as being forwarded early. Additionally, in a multi-barrier command setting, the early-forwarded transaction may include an identifier that indicates which barrier command needs to be completed before executing the transaction. In another embodiment, an early-forwarded transaction may be locked and sent to the target computing system in the locked form such that the early-forwarded transaction cannot be executed until it is unlocked with a key.

At block 310, the target computing systems that receive early-forwarded transactions are added to a post-barrier spreading range. Similar to the pre-barrier spreading range, the post-barrier spreading range may either be dynamically determined or be predetermined. For instance, hardware can dynamically collect the addresses or IDs of the target computing systems that the source computing system has sent early-forwarded transactions to and add those target computing systems to the post-barrier spreading range. Alternatively, the addresses or IDs of target computing systems that are sent early-forwarded transactions can be predetermined and stored by software to the post-barrier spreading range. In one embodiment, each barrier command may have an index to one of the post-barrier spreading ranges such that the index can be used to retrieve the list of addresses or IDs of the target computing systems associated with that barrier command. However, embodiments are not limited to any particular method or components for generating or obtaining a post-barrier spreading range, and embodiments can include post-barrier spreading ranges generated or obtained in any manner.

At block 312, the source computing system monitors the execution status of the transactions and determines when a barrier command is completed. For example, the method shown in FIG. 2 can be used to determine when a barrier command is completed. At block 314, after determining that a barrier command is completed, the source computing system sends post-barrier start notices to the target computing systems in the post-barrier spreading range that received early-forwarded transactions at block 308. Alternatively, in an embodiment in which early-forwarded transactions are locked at block 308, the source computing system may send a key to unlock the locked early-forwarded transactions to the target computing systems that received the locked early-forwarded transactions. At block 316, the target computing systems receive the post-barrier start notices or the keys, and the target computing systems either remove the early-forwarded attributes or unlock the early-forwarded transactions. In a multi-barrier command setting, the post-barrier start notices may include an indication of one of the barrier commands, and the target computing systems may only remove the early-forwarded attributes from the transactions corresponding to the identified barrier command. At block 318, the target computing systems execute the transactions that were forwarded early at block 308.

Figure 4:
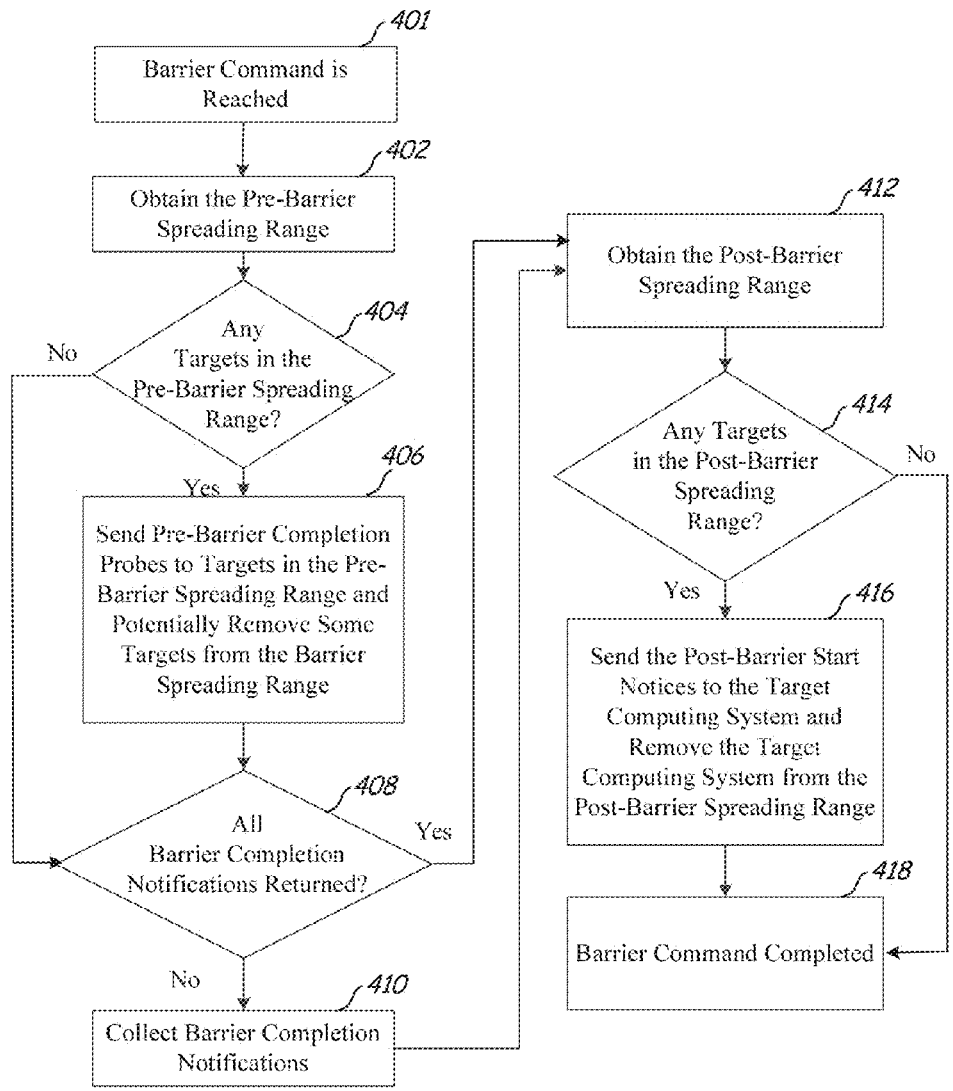
FIG. 4 is a flow diagram of a method of handling barrier commands from the perspective of a source computing system.

FIG. 4 is a flow diagram of a method of handling barrier commands from the perspective of a source computing system. At block 401, the source computing system reaches a barrier command in a program. At block 402, the source computing system obtains a pre-barrier spreading range for the barrier command. As previously mentioned, the pre-barrier spreading range can be dynamically determined, can be predetermined, or can be obtained in any other manner. At block 404, the source computing system determines whether there are any target computing systems in the pre-barrier spreading range that need to be sent pre-barrier completion probes (e.g., target computing systems that receive pre-barrier affected transactions that have not been executed yet). If there are target computing systems in the pre-barrier spreading range that need to be sent pre-barrier completion probes, the source computing system sends the pre-barrier completion probes to the target computing systems in the pre-barrier spreading range at block 406. Additionally, if there are any target computing systems in the pre-barrier spreading range that have already executed their affected transactions when the pre-barrier completion probes are sent, those target computing systems can either be removed from the pre-barrier spreading range or can be marked as having finished executing their transactions at block 406. After block 406 or after block 404 if there are no target computing systems in the pre-barrier spreading range that need to be sent pre-barrier completion probes, the source computing system determines whether all of the barrier completion notification messages are received from the target computing systems. If not all of the barrier completion notification messages have been received, the source computing system continues to collect barrier completion notification messages from the target computing systems at block 410. After block 410 or after block 408 if all of the notification messages have been received, the source computing system obtains the post-barrier spreading range for the barrier command at block 412. The post-barrier spreading range can again be determined dynamically, can be predetermined, or can be obtained in any other manner. At block 414, the source computing system determines whether there are any targeting computing systems in the post-barrier spreading range. If there are target computing systems in the post-barrier spreading range, the source computing system sends the post-barrier start notices to the target computing systems and removes the target computing systems from the post-barrier spreading range at block 416. After block 416 or after block 414 if there are no target computing systems in the post-barrier spreading range, the target computing system has completed the barrier command at block 418.

Figure 5:
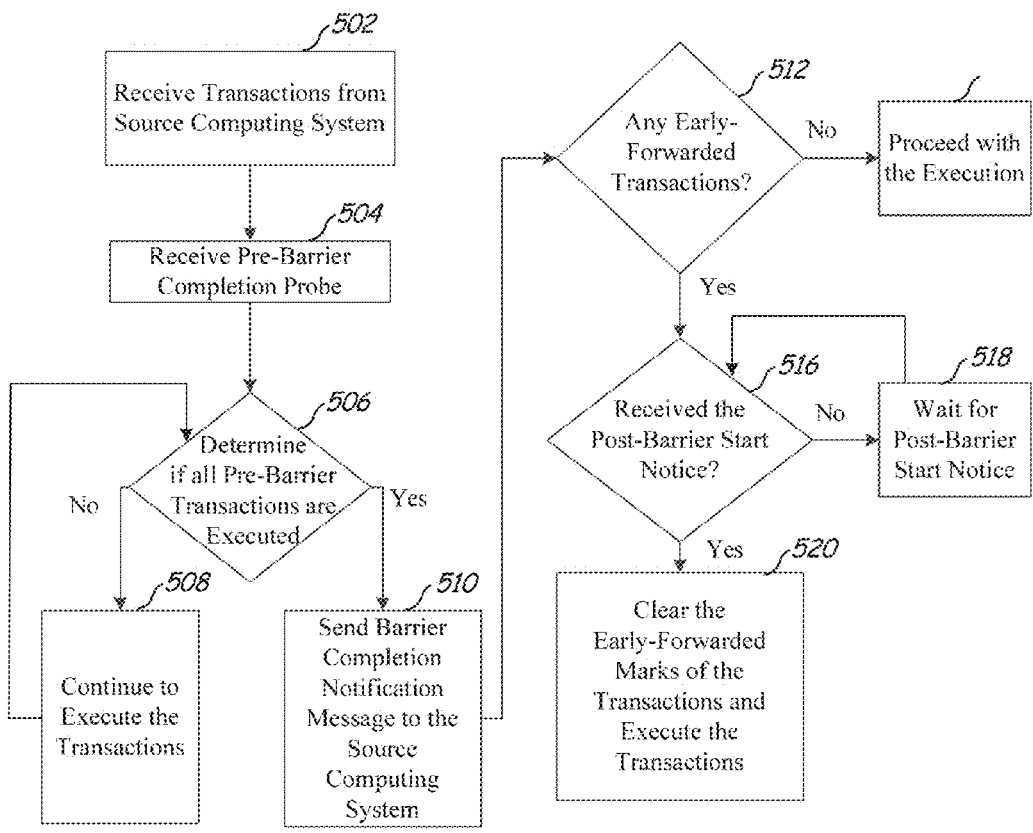
FIG. 5 is a flow diagram of a method of handling barrier commands from the perspective of a target computing system.

FIG. 5 is a flow diagram of a method of handling barrier commands from the perspective of a target computing system. At block 502, the target computing system receives transactions from the source computing system. At block 504, the target computing system receives a pre-barrier completion probe. The pre-barrier completion probe optionally identifies a barrier command, transactions that the target computing system needs to execute for the particular barrier command to be completed (e.g., pre-barrier affected transactions), and/or a number of transactions that the target computing system needs to execute for the particular barrier command to be completed. At block 506, the target computing system determines if it has executed all of the transactions identified by the pre-barrier completion probe or if it can guarantee that it will behave like it has executed all of the transactions identified by the pre-barrier completion probe. If not all of the pre-barrier transactions have been executed or if it cannot guarantee that it will behave like it has executed all of the pre-barrier transactions, the target computing system continues to execute the pre-barrier affected transactions at block 508. If all of the pre-barrier affected transactions have been executed or it the target computing system can guarantee that it will behave like it has executed all of the pre-barrier affected transactions, the target computing system continues to block 510 where it sends a barrier completion notification message to the source computing system. At block 512, the target computing system determines if any of its received transactions are marked as being early-forwarded transactions (e.g., if any of its transactions have an early-forwarded attribute). If none of the transactions are marked as being early-forwarded transactions, the target computing system proceeds with executing the transactions at block 514. If any of the transactions are marked as being early-forwarded transactions, the target computing system determines if it received a post-barrier start notice for the transaction from the source computing system at block 516. If the target computing system has not received the post-barrier start notice for the transaction, the target computing system continues to block 518 where it waits to receive the post-barrier start notice before executing the transaction. The target computing system may however continue to execute transactions that are not marked as being early-forwarded. If the target computing system has received the post-barrier start notice for the transaction, the target computing system continues to block 520 where it clears the early-forwarded mark of the transaction (e.g., removes or changes an early-forwarded attribute, unlocks the transaction, etc.). The target computing system then proceeds to execute the transactions that were previously marked as being early-forwarded transactions.

Figure 6:
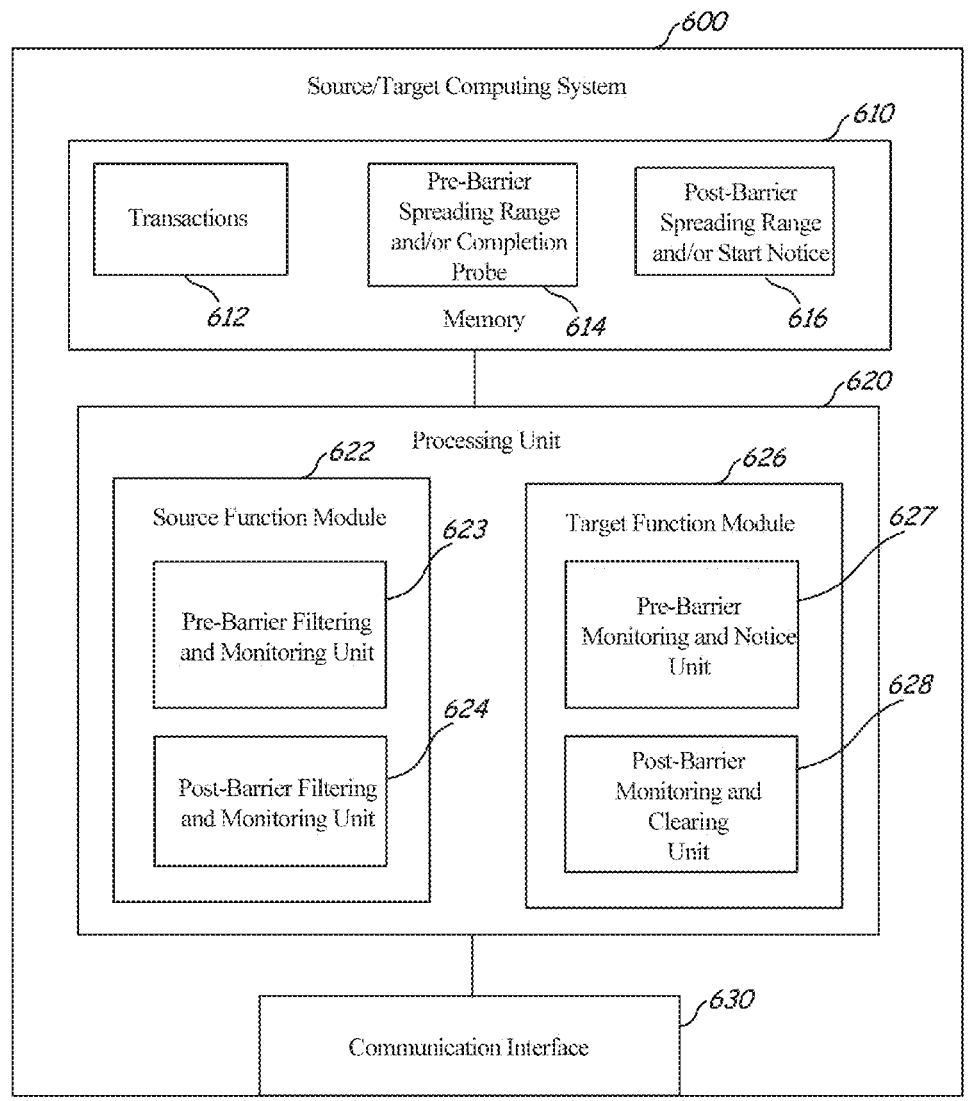
FIG. 6 is a schematic diagram of a source and/or a target computing system.

FIG. 6 is a schematic diagram of a source and/or a target computing system 600. Computing system 600 includes a memory 610, a processing unit 620, and a communication interface 630. Memory 610 optionally includes transactions 612, a pre-barrier spreading range and/or probe 614, and a post-barrier spreading range and/or start notice 616. Each transaction 612 may have an indication of a barrier command associated with the transaction, an indication of a target computing system, and/or an early-forwarding attribute. Pre-barrier spreading range and/or completion probe 614 may have a pre-barrier spreading range and one or more pre-barrier completion probes. Each pre-barrier completion probe may include an indication of a barrier command associated with the probe, an indication of transactions associated with the probe, and/or an indication of a number of transactions associated with the probe. Post-barrier spreading range and/or start notice 616 may have a post-barrier spreading range and one or more post-barrier start notices. Each post-barrier start notice may include an indication of a barrier command associated with the notice and/or an indication of transactions associated with the start notice.

Processing unit 620 optionally includes a source function module 622 and a target function module 626. Source function module 622 may have a pre-barrier filtering and monitoring unit 623 and a post-barrier filtering and monitoring unit 624. Pre-barrier filtering and monitoring unit 623 can be configured to determine which target computing systems need to receive pre-barrier completion probes and monitor the status of a barrier command (e.g., whether or not a barrier command is completed). Post-barrier filtering and monitoring unit 624 can be configured to determine which target computing systems need to receive a post-barrier start notice and determine which transactions are being forwarded early.

Target function module 626 may have a pre-barrier monitoring and notice unit 627 and a post-barrier monitoring and clearing unit 628. Pre-barrier monitoring and notice unit 627 can be configured to determine whether all of the transactions associated with a pre-barrier completion probe have been executed or whether the target computing system can guarantee that it will behave like it has executed all of the transactions associated with the pre-barrier completion probe (e.g., all of the pre-barrier affected transactions), and the pre-barrier monitoring and notice unit 627 can send a barrier completion notification message to a source computing system when all of the transactions associated with the pre-barrier completion probe have been executed or when it can guarantee that it will behave like it has executed all of the transactions associated with the pre-barrier completion probe. Post-barrier monitoring and clearing unit 628 can be configured to determine whether a post-barrier start notice has been received and clear (e.g., remove or unlock) early-forwarding attributes of transactions.

Communication interface 630 is configured to be communicatively coupled to other target and/or source computing systems. Transactions, pre-barrier completion probes, barrier completion notification messages, post-barrier start notices, and any other information that needs to be sent or received by a source or a target computing system can be sent or received through communication interface 630. Additionally, it should be noted that the memory 610, processing unit 620, and communication interface 630 can be configured to implement any one or more of the features described above or shown in the accompanying drawings and are not necessarily limited to the particular exemplary functions described above.

Figure 7:
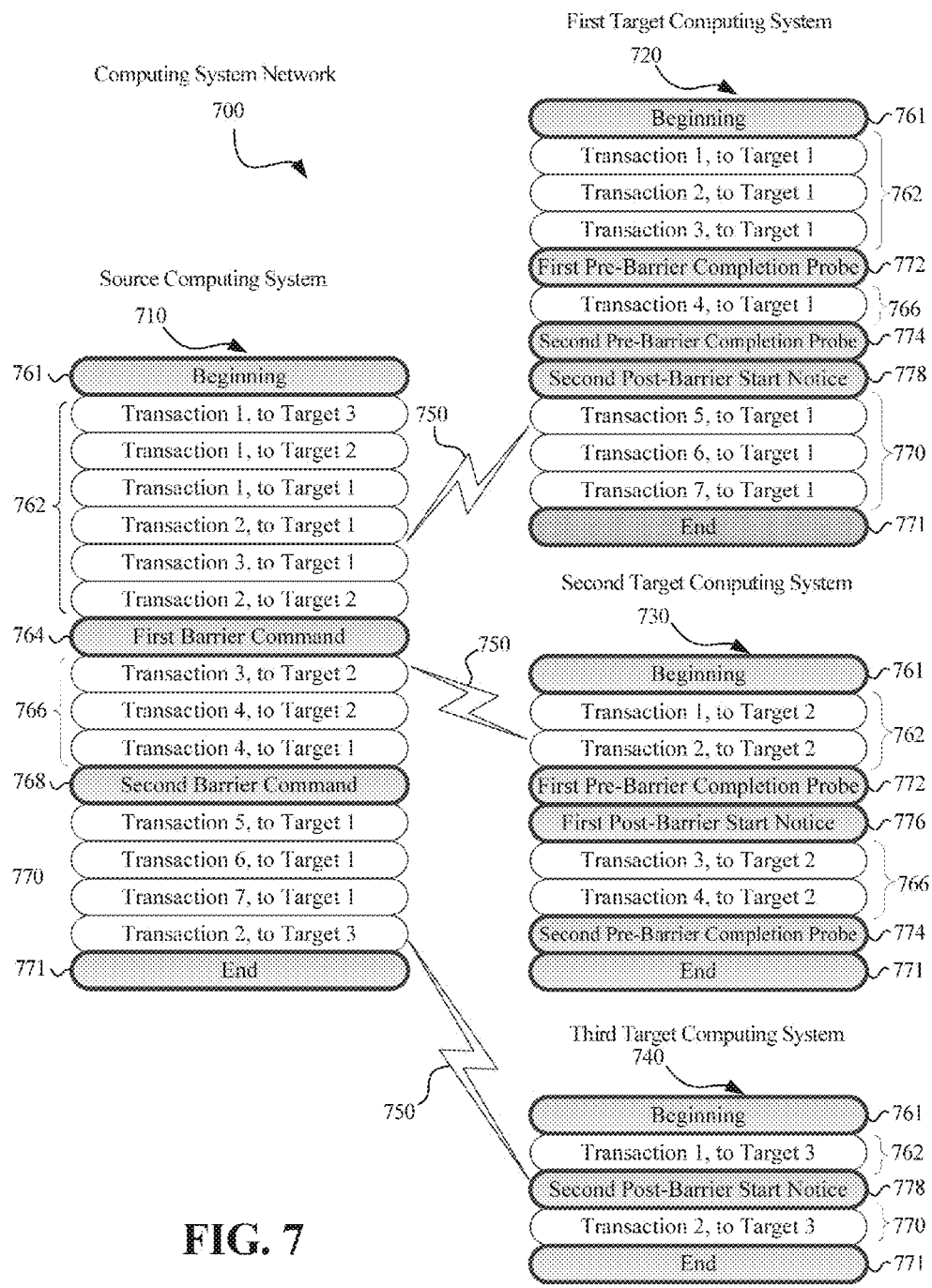
FIG. 7 is a schematic diagram of an example of handling barrier commands when the target computing systems receive the transactions in-order.

FIG. 7 is a schematic diagram of an example of a computing system network 700 handling barrier commands when the target computing systems receive the transactions in-order. Network 700 includes a source computing system 710 that is communicatively coupled to three target computing systems 720, 730, and 740 through a communication channel 750. Although the particular example shown in FIG. 7 includes one source computing system 710 and three target computing systems 720, 730, and 740, embodiments are not limited to any particular number of source and target computing systems and can include any number of source and target computing systems.

Source computing system 710 includes a computer program that includes a beginning 761, transactions 762 in a first group of transactions, a first barrier command 764, transactions 766 in a second group of transactions, a second barrier command 768, transactions 770 in a third group of transactions, and an end 771. Barrier commands 764 and 768 can be used to specify an order in which the transactions need to be executed. For instance, first barrier command 764 indicates that transactions 762 in the first group of transactions need to be executed before any of the transactions 766 in the second group of transactions or transactions 770 in the third group of transactions is executed. Second barrier command 768 indicates that transactions 766 in the second group of transactions need to be executed before any of the transaction 770 in the third group of transactions is executed. In the example shown in FIG. 7 and the example shown later in FIG. 8, it is assumed that all of the transactions are affected transactions (e.g., all of the transactions before a barrier command are pre-barrier affected transactions and all of the transactions after a barrier command are post-barrier affected transactions). However, embodiments may also include non-affected transactions that do not affect the completion of a barrier command and/or do not need to wait for a barrier command to be completed before being executed.

Each target computing system 720, 730, and 740 receives the transactions 762, 766, 770 that it is required to execute from the source computing system 710. In one embodiment, each transaction may include or be associated with a target identifier (e.g., an address or ID of a target computing system), and the source computing system 710 can forward the transactions to the corresponding target computing system 720, 730, or 740 based on the target identifiers. Each target computing system 720, 730, and 740 may also receive one or more pre-barrier completion probes 772, 774 and/or one or more post-barrier start notices 776, 778. In the example shown in FIG. 7, each target computing system 720, 730, and 740 receives the transactions 762, 766, 770, the pre-barrier completion probes 772, 774, and the post-barrier start notices 776, 778 in the order shown going from the beginning 761 to the end 771 for each target computing system 720, 730, and 740.

Pre-barrier completion probes 772 and 774 are used by system 700 to monitor the execution status of the transactions. For instance, both target system 720 and target system 730 include transactions 762 from the first group of transactions that need to be executed before any of the transactions 766 in the second group and transactions 770 in the third group of transactions can be executed. Accordingly, target system 720 and target system 730 receive a first pre-barrier completion probe 772. First pre-barrier completion probe 772 instructs target computing system 720 and target computing system 730 to monitor the execution status of the transactions 762 in the first group and to send the source computing system 710 a barrier completion notification message when each of them completes the execution of the transactions 762 in the first group or when each of them can guarantee that they will behave like they have executed the transactions 762 in the first group. Therefore, source computing system 710 can determine that the first barrier command 764 is completed once it receives the first barrier completion notification messages from target computing system 720 and target computing system 730.

It should be noted that third target computing system 740 also includes a transaction 762 from the first group of transactions, but does not receive a first pre-barrier completion probe 772. In an embodiment, computing system 740 does not receive a first pre-barrier completion probe 772, because computing system 740 finishes executing transaction 762 before the pre-barrier completion probes 772 for the first barrier command 764 are issued. Accordingly, target computing system 710 can limit the number of target computing systems that receive the pre-barrier completion probes to only include the target computing systems that still have transactions that need be executed for a barrier command to be completed when the pre-barrier completion probes are sent.

Target computing system 720 and target computing system 730 also receive transactions 766 from the second group of transactions and accordingly receive a second pre-barrier completion probe 774. Based on receiving the second pre-barrier completion probe 774, target computing system 720 and target computing system 730 monitor the execution status of the transactions 766 and send the source computing system 710 a barrier completion notification message when each of them completes the execution of the transactions 766 or when each of them can guarantee that they will behave like they have executed the transactions 766. Source computing system 710 can then determine that the second barrier command 768 is completed once it receives the second barrier completion notification messages from target computing system 720 and target computing system 730.

Post-barrier start notices 776 and 778 are used by system 700 to trigger the execution of the transactions at the appropriate time. In one embodiment, if transactions are sent to the target computing systems 720, 730, and 740 before it is time for the transactions to be executed (e.g., if transactions 766 in the second group of transactions are sent to a target computing system before all of the transactions 762 in the first group of transactions are executed, or if transaction 770 in the third group of transactions are sent to a target computing system before all of the transactions 762 in the first group of transactions and the transactions 766 in the second group of transactions are executed), the transactions are identified as being early-forwarded transactions. As previously discussed, the early-forwarded transactions may have an attribute that identifies them as being forwarded early. In such a case, the target computing systems 720, 730, and 740 will not execute any early-forwarded transactions until it receives the corresponding post-barrier start notice 776 or 778. In FIG. 7, target computing system 730 includes a first post-barrier start notice 776, and target computing system 720 and target computing system 740 include a second post-barrier start notice 778. Accordingly, target computing system 730 will not execute the transactions 766 from the second group of transactions until it receives the first post-barrier start notice 776, and target computing system 720 and target computing system 740 will not execute the transactions 770 from the third group until they receive the second post-barrier start notice 778.

It should be noted that first target computing system 720 also includes a transaction 766 from the second group of transactions, but does not receive a first post-barrier start notice 776. In an embodiment, computing system 720 does not receive a first post-barrier start notice 776, because computing system 720 receives transaction 766 after all of the transactions needed to complete the first barrier command 764 (e.g., transactions 762) have been executed. Accordingly, source computing system 710 can limit the number of target computing systems that receive the post-barrier start notices to only include the target computing systems that receive transactions that are forwarded early (e.g., transactions that are sent before a required barrier command is completed).

Figure 8:
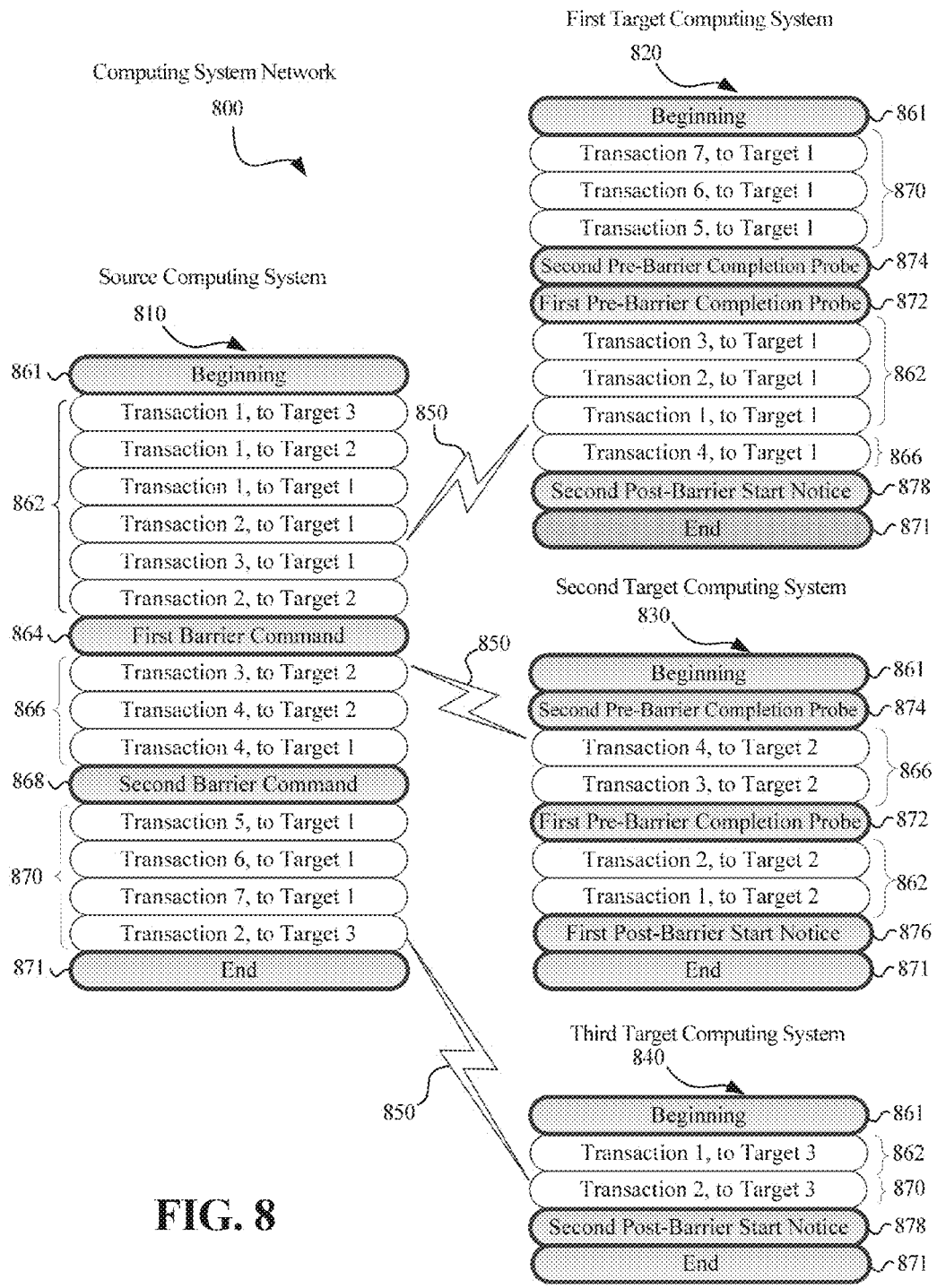
FIG. 8 is a schematic diagram of an example of handling barrier commands when the target computing systems receive the transaction out-of-order.

FIG. 8 is a schematic diagram of an example of a computing system network 800 handling barrier commands when the target computing systems receive the transactions out-of-order. Computing system network 800 is similar to computing system network 700 shown in FIG. 7. However, in computing system network 800, the transactions 862, 866, 870, the pre-barrier completion probes 872, 874, and the post-barrier start notices 876, 878 are not forwarded to the target computing systems 820, 830, 840 in-order. Instead, the transactions 862, 866, 870, the pre-barrier completion probes 872, 874, and post-barrier start notices 876, 878 are forwarded to the target computing systems 820, 830, 840 out-of-order. In particular, the target computing systems 820, 830, and 840 receive the transactions 862, 866, 870, the pre-barrier completion probes 872, 874, and the post-barrier start notices 876, 878 in the order shown in FIG. 8 going from the beginning 861 to the end 871 for each target computing system 820, 830, and 840.

First target computing system 820 first receives transactions 870 from the third group of transactions. As previously mentioned, when transactions are forwarded early (e.g, when transactions are forwarded to a target computing system before a required barrier command has been completed), the early-forwarded transactions may include an early-forwarding attribute or be locked such that the early-forwarded transactions are not executed by the target computing system until any required barrier commands have been completed. Accordingly, in the example shown in FIG. 8, when target computing system 820 receives transactions 870 from the third group of transactions first, transactions 870 will have an early-forwarding attribute or be locked. Therefore, target computing system 820 will wait to execute transactions 870 until it later receives the second post-barrier start notice 878 indicating that second barrier command 868 is completed.

Next, first target computing system 820 receives the second pre-barrier completion probe 874 and the first pre-barrier completion probe 872. As previously mentioned, pre-barrier completion probes 872, 874 may identify the transactions that need to be executed and/or the number of transactions that need to be executed for a particular barrier command to be completed. Additionally, in a multi-barrier command setting, the pre-barrier completion probes 872, 874 may identify one of the multiple barrier commands. Accordingly, when first target computing system 820 receives pre-barrier completion probes 872, 874 that are forwarded early (e.g., the pre-barrier completion probes 872, 874 are forwarded to first target computing system 820 before the transactions associated with the pre-barrier completion probes 872, 874 are sent to the first target computing system 820), the target computing system 820 can use the information included along with the pre-barrier completion probes 872, 874 to monitor the status of the pre-barrier completion probe 872, 874, which are early-forwarded barriers. For instance, the first target computing system 820 can use the number of transactions, the indication of the transactions, and/or the indication of the barrier command to determine when it has executed all of the transactions associated with a particular pre-barrier completion probe 872, 874 and then send a barrier completion notification message to the source computing system 810 when it has executed all of the required transactions or when it can guarantee that it will behave like it has executed all of the required transactions.

First target computing system 820 then receives transactions 862 from the first group of transactions. Transactions 862 do not require the completion of any barrier command to be executed. In other words, transactions 862 are not early-forwarded transactions. Accordingly, first target computing system 820 can execute transactions 862 without waiting for the completion of a barrier command. Once first target computing system 820 has executed the transactions 862 or can guarantee that it will behave like it has executed transactions 862, first target computing system 820 will determine that it has executed the transactions required by first pre-barrier completion probe 872 and can send a first barrier completion notification message to source computing system 810.

First target computing system 820 next receives transaction 866 from the second group of transactions. In the example shown in FIG. 8, all of the transactions 862 that need to be executed for the first barrier command 864 to be completed have been executed when first target computing system 820 receives transaction 866. Accordingly, transaction 866 is not an early-forwarded transaction, and first target computing system 820 does not need to receive a first post-barrier start notice. Instead, first target computing system 820 can execute transaction 866 any time after it is received. Once first target computing system 820 has executed transaction 866 or can guarantee that it will behave like it has executed transaction 866, first target computing system 820 will determine that it has executed the transactions required by second pre-barrier completion probe 874 and can send a second barrier completion notification message to source computing system 810.

First target computing system 820 lastly receives second post-barrier start notice 878 that notifies target computing system 820 that it can begin to execute transactions 870 that were previously forwarded to target computing system 820 early. Therefore, once target computing system 820 receives second post-barrier start notice 878, it can finish executing the rest of its transactions (i.e., transactions 870).

Second target computing system 830 first receives second pre-barrier completion probe 874. Since second target computing system 820 has not yet received the transactions 866 associated with the second pre-barrier completion probe 874, the second pre-barrier completion probe 874 is an early-forwarded pre-barrier completion probe and may include an indication of the transactions, a number of transactions, and/or a barrier command associated with the second pre-barrier completion probe 874. Second target computing system 830 will use that information to determine when it has executed the transactions required by second pre-barrier completion probe 874.

Next, second target computing system 830 receives transactions 866 from the second group of transactions. Transactions 866 are received before the first barrier command 864 is completed. Therefore, transactions 866 are identified as being early-forwarded transactions and second target computing system 830 will wait to execute the transactions.

Second target computing system 830 then receives the first pre-barrier completion probe 872. First pre-barrier completion probe 872 may identify the transactions that need to be executed and/or the number of transactions that need to be executed for the first barrier command 864 to be completed. Pre-barrier completion probe 872 may also identify which barrier command (e.g., first barrier command 864) that it is associated with. The second target computing system 830 can use the information included along with the pre-barrier completion probe 872 to monitor the status of the pre-barrier completion probe 872 and send a second barrier completion notification message after it has executed all of the required transactions or when it can guarantee that it will behave like it has executed all of the required transactions.

Second target computing system 830 next receives transactions 862 from the first group of transactions. Transactions 862 do not require the completion of any barrier command to be executed. Therefore, second target computing system 830 can execute transactions 862 without waiting for the completion of a barrier command. Once second target computing system 830 has executed the transactions 862 or can guarantee that it will behave like it has executed all of the required transactions, second target computing system 830 will determine that it has executed the transactions required by first pre-barrier completion probe 872 and can send a first barrier completion notification message to source computing system 810.

Second target computing system 830 lastly receives the first post-barrier start notice 876 that notifies second target computing system 830 that it can begin executing second transactions 866. Once second target computing system 830 has executed transactions 866 or can guarantee that it will behave like it has executed transactions 866, second target computing system 830 will determine that it has executed the transactions required by second pre-barrier completion probe 874 and will send a second barrier completion notification message to source computing system 810.

Third target computing system 840 first receives transaction 862 from the first group of transactions. Transaction 862 does not require the completion of any barrier command to be executed, thus third target computing system 840 can execute transaction 862 without waiting for the completion of a barrier command. In the example shown in FIG. 8, third target computing system 840 executes transaction 862 before source computing system 810 reaches the first barrier command 864. Accordingly, third target computing system 840 does not receive a first pre-barrier completion probe 872, because third target computing system 840 has executed its one transaction 862 needed for the first barrier command 864 to be completed before the first pre-barrier completion probes 872 are issued.

Third target computing system 840 then receives transaction 870 from the third group of transactions. Transaction 870 is illustratively an early-forwarded transaction, so third target computing system 840 waits to execute transaction 870 until it receives the second post-barrier start notice 878, which it receives last.

As described above and shown in the figures, embodiments include methods and apparatuses for handling barrier commands for computing systems. In certain instances, barrier commands are implemented using pre-barrier spreading ranges, pre-barrier completion probes, barrier completion notification messages, post-barrier spreading ranges, and post-barrier start notices. Systems that use the features described above can reduce barrier command messaging traffic by only sending barrier command messages to the required computing systems. Additionally, at least certain embodiments allow for transactions and barrier command messages to be forwarded to computing system either in-order or out-of-order (e.g., transactions and barrier command messages can be forwarded early). These features can be beneficial in reducing barrier spreading range, reducing barrier messaging traffic, enabling early-forwarding of transactions, enabling early forwarding of barrier command messages, increasing computing parallelism, and requiring less bandwidth.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A computing system comprising:
a memory configured to store a pre-barrier spreading range that identifies a target computing system associated with a barrier command, wherein the memory is configured to store a post-barrier spreading range that includes an indication of at least one of the target computing system and other target computing systems that receive early-forwarded transactions, wherein the early-forwarded transactions comprise transactions that can only be executed after the barrier command is completed;
an interface coupled to the memory and configured to send a pre-barrier computing probe to the target computing system identified in the pre-barrier spreading range and receive a barrier completion notification message from the target computing system, wherein the pre-barrier computing probe is configured to instruct the target computing system to monitor a status of a transaction that needs to be executed for the barrier command to be completed, wherein the face is configured to send a post-barrier start notice to at least one of the target computing system and the other target computing systems that receive the early-forwarded transactions when the barrier command is completed; and
a processor coupled to the interface and configured to determine a status of the barrier command based on the received barrier completion notification message, wherein the processor is configured to determine that the barrier command is completed when all target computing systems that are sent transactions that need to be executed for the barrier command to be completed have indicated at least one of finished transaction execution and guarantee of finished transaction execution behavior.

2. The computing system of claim 1, wherein the barrier completion notification message is received from the target computing system, and wherein the barrier completion notification message indicates that the target computing system has executed the transaction that needs to be executed for the barrier command to be completed or that the barrier completion notification message indicates that the target computing system is guaranteed to behave like it has executed the transaction that needs to be executed for the barrier command to be completed.

3. The computing system of claim 1, wherein the interface is configured to send transactions that can only be executed after the barrier command is completed to the target computing system when the processor determines that the barrier command is completed.

4. The computing system of claim 1, wherein the processor is configured to identify transactions being forwarded to the target computing system before a completion of a required barrier command, wherein the interface is configured to send the identified transactions to the target computing system with an indication that the transactions are early-forwarded transactions, wherein the indication that the transactions are early-forwarded transactions comprises the transactions including early-forwarded attributes, or wherein the indication that the transactions are early-forwarded transactions comprises the transactions being locked such that the transactions cannot be executed until being unlocked with a key.

5. The computing system of claim 1, wherein the pre-barrier spreading range identifies the target computing system and any other target computing systems that receive transactions that need to be executed before the barrier command is completed, and wherein the target computing system and the other target computing systems are either pre-determined or are dynamically determined by the processor.

6. The computing system of claim 1, wherein the barrier command is associated with a program that comprises multiple barrier commands and multiple target computing systems, and wherein the pre-barrier spreading range comprises addresses or other identifiers of at least one of the target computing system and the other target computing systems associated with the barrier command and identifiers of transactions that are associated with the multiple barrier commands.

7. A computing system comprising:
an interface configured to receive a pre-barrier computing probe from a source computing system and send a barrier completion notification message to the source computing system, wherein the pre-barrier computing probe instructs the computing system to monitor a status of a transaction that is associated with a barrier command, and wherein the barrier completion notification message indicates that the transaction associated with the barrier command has been executed by the computing system or that the computing system guarantees that it will behave like it has executed the transaction; and
a processor coupled to the interface and configured to wait to execute an early-forwarded transaction until a post-barrier start notice is received from the source computing system, wherein the early-forwarded transaction comprises a transaction that can only be executed after the barrier command is completed, and wherein the post-barrier start notice indicates that the barrier command associated with the early-forwarded transaction has been completed.

8. The computing system of claim 7, wherein the processor is configured to execute the transaction after the interface has received a key to unlock the transaction from the source computing system.

9. The computing system of claim 7, wherein the pre-barrier computing probe identifies a number of transactions that need to be executed for the barrier command to be completed, and wherein the computing system is configured to send the source computing system the barrier completion notification message when all the transactions have been executed or when the computing system can guarantee that it will behave like it has executed all of the transactions.

10. The computing system of claim 7, wherein the computing system is configured to receive a plurality of pre-barrier computing probes, wherein each of the pre-barrier computing probes is associated with a different barrier command, and wherein each pre-barrier computing probe identifies a particular barrier command associated with the pre-barrier computing probe.

11. A method comprising:
identifying a transaction associated with a completion of a barrier command;
identifying a target computing system associated with the transaction;
sending the target computing system a pre-barrier computing probe, wherein the pre-barrier computing probe instructs the target computing system to monitor an execution status of the transaction associated with the completion of the barrier command;
receiving a barrier completion notification message from the target computing system, wherein the barrier completion notification message indicates that the target computing system has executed the transaction associated with the completion of the barrier command or that the target computing system can guarantee that it will behave like it has executed the transaction associated with the completion of the barrier command;
determining whether the barrier command is completed based on the received barrier completion notification message, wherein the barrier command is determined to have been completed when all target computing systems that were sent pre-barrier computing probes have returned their barrier completion notification messages; and
sending a post-barrier start notice to at least one of the target computing system and other target computing systems that receive early-forwarded transactions when the barrier command is completed, wherein the early-forwarded transactions comprise transactions at can only be executed after the barrier command is completed.

12. The method of claim 11, wherein sending the identified target computing system the pre-barrier computing probe comprises sending the identified target computing system an indication of a number of transactions that need to be executed.

13. The method of claim 11, wherein sending the identified target computing system the pre-barrier computing probe comprises sending the identified target computing system an indication of a particular barrier command associated with the pre-barrier computing probe.

14. A method comprising:
receiving a pre-barrier computing probe from a source computing system, wherein the pre-barrier computing probe is configured to instruct a target computing system that receives the pre-barrier computing probe to monitor a status of a transaction that is associated with a barrier command;
receiving an early-forwarded transaction, wherein the early-forwarded transaction is received by the target computing system before a barrier command associated with the early-forwarded transaction is completed, and wherein the early-forwarded transaction can only be executed after the barrier command associated with the early-forwarded transaction is completed;
sending the source computing system a barrier completion notification message that indicates that the transaction associated with the barrier command has been executed or that the target computing system guarantees that it will behave like it has executed the transaction; and
executing the early-forwarded transaction after receiving a post-barrier start notice from the source computing system, wherein the post-barrier start notice indicates that the barrier command associated with the early-forwarded transaction has been completed.

15. The method of claim 14, wherein the pre-barrier computing probe identifies a number of transactions that need to be executed for the barrier command to be completed, and wherein the target computing system is configured to send the source computing system the barrier completion notification message when all the transactions have been executed or when the target computing system can guarantee that it will behave like it has executed all of the transactions.

16. The method of claim 14, further comprising receiving a plurality of pre-barrier computing probes from the source computing system, wherein each of the pre-barrier computing probes is associated with a different barrier command, and wherein each pre-barrier computing probe identifies a particular barrier command associated with the pre-barrier computing probe.

17. The method of claim 14, wherein the early-forwarded transaction comprises an early-forwarded attribute, and wherein the target computing system waits to execute the early-forwarded transaction based at least in part on the early-forwarded attribute.

18. The method of claim 14, wherein the early-forwarded transaction is locked, and wherein the target computing system waits to execute the early-forwarded transaction until receiving a key to unlock the early-forwarded transaction.

19. The method of claim 14, wherein the post-barrier start notice comprises an indication of one of multiple barrier commands associated with a program and an indication of multiple transactions that are associated with the one of the multiple barrier commands.

\* \* \* \* \*